Jan. 24, 1956

B. C. GARDNER ET AL 2,732,002

BONDING YARNS TO POLYVINYL CHLORIDES
IN MAKING COMPOSITE ARTICLES
Filed Feb. 2, 1954

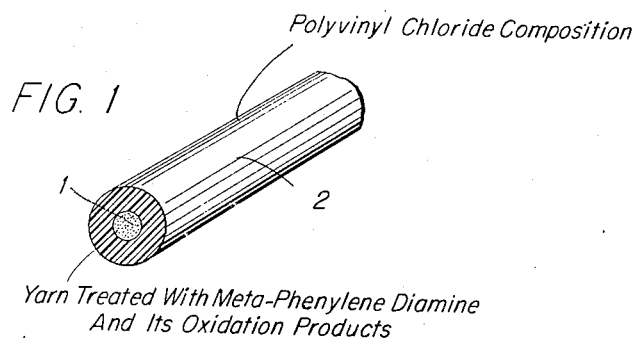

FIG. 1

Polyvinyl Chloride Composition

Yarn Treated With Meta-Phenylene Diamine
And Its Oxidation Products

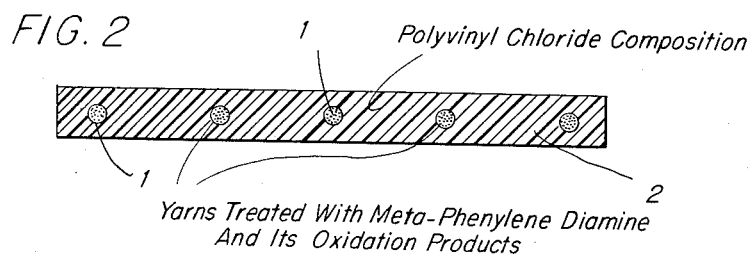

FIG. 2

Polyvinyl Chloride Composition

Yarns Treated With Meta-Phenylene Diamine
And Its Oxidation Products

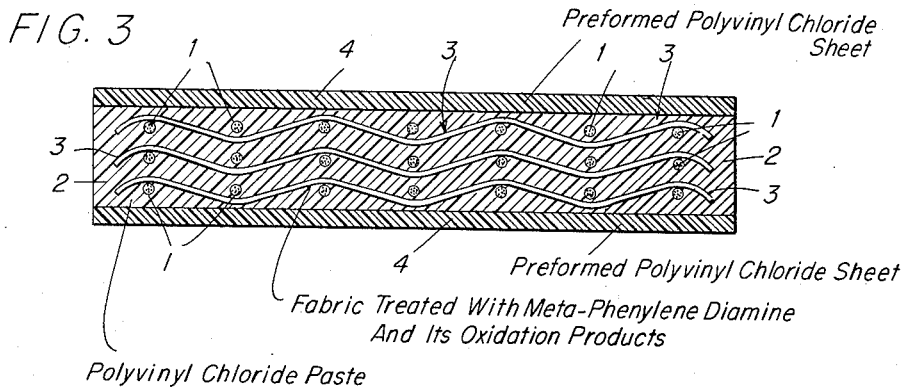

FIG. 3

Preformed Polyvinyl Chloride Sheet

Preformed Polyvinyl Chloride Sheet

Fabric Treated With Meta-Phenylene Diamine
And Its Oxidation Products

Polyvinyl Chloride Paste

INVENTORS
Brian Conrad Gardner
Edwin Holroyd Sharples
BY their attorneys

Howson and Howson.

United States Patent Office 2,732,002
Patented Jan. 24, 1956

2,732,002

BONDING YARNS TO POLYVINYL CHLORIDES IN MAKING COMPOSITE ARTICLES

Brian C. Gardner, Coventry, and Edwin H. Sharples, Kenilworth, England, assignors to Courtaulds Limited, London, England, a British company Application February 2, 1954, Serial No. 407,796

Claims priority, application Great Britain March 9, 1953

4 Claims. (Cl. 154—4)

This invention relates to the production of composite articles obtained by bonding yarns to polyvinyl chloride, for example the bonding of regenerated cellulose cords to polyvinyl chloride in the manufacture of conveyor belts.

In many industries, conveyor belts are used to carry raw materials and products in various stages of their manufacture from place to place in a factory, mine or other establishment. Conveyor belts have usually been made of one or more layers of woven fabric embedded in rubber to protect the fabric. If a rubber-covered belt is subjected to undue friction there is some fire risk. In order to reduce the fire risk it is known to replace the rubber in ocnveyor belts by a plasticised polyvinyl chloride composition, since polyvinyl chloride is more resistant to flame than rubber, in addition to being resistant to abrasion and to chemicals. In the production of a polyvinyl chloride conveyor belt, difficulties are encountered in obtaining a good bond between the fibres of the woven fabric and the polyvinyl chloride composition.

The object of the present invention is to improve the bonding of yarns to polyvinyl chloride compositions.

According to the present invention, a process for the production of a composite article comprising yarns bonded to polyvinyl chloride compositions includes the steps of treating the yarns with *meta*-phenylene diamine and then bringing the treated yarns into contact with a polyvinyl chloride composition. The treated yarns may be allowed to age before contacting with the polyvinyl chloride compositions in order to allow the *meta*-phenylene diamine to oxidise.

The present invention also includes a composite article comprising yarns bonded to polyvinyl chloride compositions wherein the bonding between the yarns and the polyvinyl chloride composition is improved by *meta*-phenylene diamine and its oxidation products.

In the accompanying drawing, wherein for the purpose of illustration, we have shown several preferred embodiments of our present invention Fig. 1 is a fragmentary, perspective view of a yarn treated with *meta*-phenylene diamine and its oxidation products and having a coating or covering thereon of polyvinyl chloride composition, Fig. 2 is a transverse sectional view through a composite article composed of a plurality of longitudinally extending yarns each treated with *meta*-phenylene diamine and its oxidation products and embedded within a mass of polyvinyl chloride composition, Fig. 3 is a transverse sectional view of a composite article composed of a plurality of plies of woven fabric, the yarns of which have been treated with meta phenylene diamine and its oxidation products, and both sides of each of which plies has applied thereto polyvinyl chloride paste, a covering of preformed sheets of polyvinyl chloride composition being applied to the upper and lower surfaces of the composite article prior to subjecting said article to heat and pressure.

Referring more in detail to the accompanying drawing, wherein like reference numerals have been employed to designate like parts throughout the several views, the numeral 1 designates a yarn of regenerated cellulose, for example, high tenacity yarn obtained from viscose or stretched and saponified cellulose ester yarn, cotton, or the like, which yarn is impregnated or treated with meta phenylene diamine and its oxidation products, and is surrounded by or embedded in a mass of polyvinyl chloride composition 2 which forms a covering or coating on the yarn. Fig. 1 shows a single yarn 1 thus treated, while Fig. 2 shows a plurality of spaced, parallel yarns 1 thus treated and surrounded by or embedded in a mass of polyvinyl chloride composition 2.

In Fig. 3 we have shown a composite article composed of a plurality of plies 3 of woven fabric, the yarns 1 of which fabric are impregnated or treated with *meta*-phenylene diamine, and which plurality of plies 3 are surrounded by or embedded in a mass of polyvinyl chloride composition 2. In this embodiment of our present invention, the upper and lower surfaces of the assembly of plies and polyvinyl chloride composition are each covered or coated with preformed sheets 4 of a polyvinyl chloride composition prior to placing the assembly in a press where it is subjected to heat and pressure to form the complete composite article.

The yarns may be impregnated with an aqueous solution of *meta*-phenylene diamine and then dried. Commercial grades of *meta*-phenylene diamine may be used to prepare the impregnating solution and any insoluble residues removed before impregnation is carried out. The *meta*-phenylene diamine is preferably added to a finishing solution applied to the yarns before drying.

The process is applicable to yarns consisting of regenerated cellulose, for example high tenacity yarns obtained from viscose or stretched and saponified cellulose ester yarns. The process is also applicable to cotton yarns.

When treating yarns of regenerated cellulose obtained from viscose, the impregnation with meta-phenylene diamine may be carried out on the singles yarn or the cord or by treatment of the cake obtained in the centrifugal spinning process or it may be applied as a processing step on a continuous spinning machine before drying or it may be applied to a woven or knitted fabric.

The polyvinyl chloride composition may contain plasticisers, lubricants, stabilisers and pigments as desired according to the use for which the finished article is required, and may be in the form of a paste which is applied to both sides of a fabric woven by conventional weaving from the meta-phenylene diamine-treated yarns, or the polyvinyl chloride composition may be applied in sheet form. Preferably the composite articles are made up by weaving meta-phenylene diamine-treated yarns into a fabric, applying polyvinyl chloride composition paste to both sides of the woven fabric thus treated, heating the fabric thus treated to gel the polyvinyl chloride composition paste, associating a plurality of plies of the woven fabric thus treated in a press, covering the associated plies with a preformed sheet of a polyvinyl chloride composition, and subjecting the composite article to heat and pressure.

The composite articles prepared according to the present invention are particularly useful as conveyor belts for coal and similar material. The invention is applicable to composite articles made from compositions of a polymer made solely from vinyl chloride or from compositions of copolymers of vinyl chloride with other monomeric compounds, for example vinyl acetate, acrylonitrile and vinylidene chloride, in which the vinyl chloride is present in not less than about 60 per cent by weight of the total weight of copolymer. The term "polyvinyl chloride composition" as used in this specification includes both the polymer and the copolymer composition.

The process of the present invention gives an increase in the strength of the bond between the yarns and the polyvinyl chloride compositions compared with the bond obtained with untreated yarns. The treatment may be applied at any stage in the manufacture of the yarns and the treatment does not affect the handling properties of the yarn.

The invention is illustrated by the following examples:

Example 1

A rayon yarn of 1180 denier, 500 filaments, which had been stretched during manufacture by a process described in United States of America Patent No. 2,192,074 and obtained in the form of a cake by the centrifugal spinning process, was washed free from acid and other impurities, and desulphurised. The cake was then impregnated with an aqueous solution containing 1.0 per cent by weight of meta-phenylene diamine. Excess of this solution was removed from the cake by centrifuging and the cake of yarn dried at 70° C. The treated yarn was allowed to stand in the air for several weeks during which time the meta-phenylene diamine present on the yarn was oxidised, the colour of the yarn changing from light yellow to dark brown. This yarn was made into a cord by inserting a twist of 13 turns per inch in the thread, and then twisting together two such threads in the opposite direction until a twist of 11 turns per inch was obtained. The adhesion of this cord to a commercial type of polyvinyl chloride sheet, which contained plasticiser, lubricant, stabiliser and pigment, was determined by measuring the force required to pull a ⅜ inch length of cord from a block of cured sheet ⅜ inch wide, ⅕ inch thick and 1 inch long. This test, known as the 'H' test, is described in Bulletin AIC–99 issued by the Southern Regional Research Laboratory of the United States Department of Agriculture in October, 1945, and in "India Rubber World," volume 114, 1946, pages 213 to 217 and 219. For evaluating the adhesion, the cord was first dried at 110° C. for 30 minutes, placed between two sheets of the polyvinyl chloride composition, and the whole subjected to a pressure of 110 lbs. per square inch for 19 minutes at 151° C. The adhesions obtained with this meta-phenylene diamine-treated rayon cord, and untreated cotton and rayon cords are given in the table below.

| Yarn | Treatment | Cord gauge in mm. | Adhesion (kgs.) | Characteristic adhesion (lbs./sq. in.) |
|---|---|---|---|---|
| Rayon A | 1% meta-phenylene diamine. | 0.551 | 5.24 | 1,420 |
| Rayon B | None | 0.550 | 3.18 | 863 |
| Rayon C | do | 0.658 | 2.95 | 669 |
| Cotton | do | 0.755 | 4.74 | 938 |

Example 2

Cord, which had been prepared from 1180 denier rayon yarn which had been treated with a 1 per cent by weight aqueous solution of meta-phenylene diamine as in Example 1, was dried by heating at 110° C. for 30 minutes, and then painted with a polyvinyl chloride paste containing plasticiser, lubricant, stabiliser and pigment. The painted cord was heated for a few minutes at 110° C. to cause the paste to gel, and then placed between two sheets of a commercial polyvinyl chloride sheet and the whole subjected to a pressure of 126 lbs. per square inch for 11 minutes at 158.5° C. The adhesion of this cord and other cords which had not been treated with meta-phenylene diamine was tested as in Example 1 except that a ³⁄₁₆ inch length of cord was pulled from a block of cured sheet ³⁄₁₆ inch wide, ⅕ inch thick and 1 inch long. The results obtained were as follows:

| Yarn | Treatment | Cord gauge in mm. | Adhesion (kgs.) | Characteristic adhesion (lbs./sq. in.) |
|---|---|---|---|---|
| Rayon D | 1% meta-phenylene diamine. | 0.551 | 3.18 | 1,723 |
| Rayon E | None | 0.568 | 2.50 | 1,314 |
| Rayon F | do | 0.652 | 2.86 | 1,308 |
| Cotton | do | 0.755 | 3.80 | 1,503 |

What we claim is:

1. A process for the production of composite articles formed of yarns bonded to polyvinyl chloride compositions comprising treating the yarns with meta-phenylene diamine, bringing the yarns into contact with a polyvinyl chloride composition, and bonding the yarns with the polyvinyl chloride composition by heat and pressure.

2. A process for the production of composite articles formed of yarns bonded to polyvinyl chloride compositions comprising treating the yarns with an aqueous solution of meta-phenylene diamine, drying the yarns thus treated, bringing the yarns thus treated into contact with a polyvinyl chloride composition, and bonding the yarns thus treated with the polyvinyl chloride composition by heat and pressure.

3. A composite article comprising a polyvinyl chloride composition bonded to a yarn by means of a material consisting essentially of meta-phenylene diamine and its oxidation products.

4. A process for the production of composite articles formed of yarns bonded to polyvinyl chloride compositions comprising treating the yarns with meta-phenylene diamine, forming the treated yarns into a woven fabric by conventional weaving, applying polyvinyl chloride composition paste to both sides of the woven fabric, heating the woven fabric thus treated to gel the polyvinyl chloride composition paste, associating a plurality of plies of the woven fabric thus treated, covering said associated plies with a preformed sheet of polyvinyl chloride composition, and subjecting the composite article to heat and pressure.

References Cited in the file of this patent

UNITED STATES PATENTS

| | | |
|---|---|---|
| 2,249,514 | Berg | July 15, 1941 |
| 2,428,716 | McGill | Oct. 7, 1947 |

FOREIGN PATENTS

| | | |
|---|---|---|
| 545,394 | Great Britain | May 22, 1942 |